United States Patent
Kim et al.

(10) Patent No.: US 11,945,914 B2
(45) Date of Patent: Apr. 2, 2024

(54) CURABLE COMPOSITION AND OPTICAL MATERIAL COMPRISING CURED PRODUCT THEREOF

(71) Applicant: LG CHEM, LTD., Seoul (KR)

(72) Inventors: Heon Kim, Daejeon (KR); Hee Jung Choi, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 614 days.

(21) Appl. No.: 17/263,065

(22) PCT Filed: May 19, 2020

(86) PCT No.: PCT/KR2020/006529
§ 371 (c)(1),
(2) Date: Jan. 25, 2021

(87) PCT Pub. No.: WO2020/235913
PCT Pub. Date: Nov. 26, 2020

(65) Prior Publication Data
US 2021/0163684 A1    Jun. 3, 2021

(30) Foreign Application Priority Data

May 21, 2019   (KR) .......................... 10-2019-0059609

(51) Int. Cl.
| | | |
|---|---|---|
| *C08G 75/06* | (2006.01) | |
| *C08G 75/0222* | (2016.01) | |
| *C08G 75/0268* | (2016.01) | |
| *G02B 1/04* | (2006.01) | |

(52) U.S. Cl.
CPC ......... *C08G 75/06* (2013.01); *C08G 75/0222* (2013.01); *C08G 75/0268* (2013.01); *G02B 1/041* (2013.01)

(58) Field of Classification Search
USPC ....................................................... 528/378
See application file for complete search history.

(56) References Cited

U.S. PATENT DOCUMENTS

| | | |
|---|---|---|
| 4,599,425 A | 7/1986 | Hugo et al. |
| 5,310,921 A | 5/1994 | Kuczkowski et al. |
| 6,486,298 B1 | 11/2002 | Jallouli et al. |
| 6,534,589 B1 | 3/2003 | Yoshimura et al. |
| 6,995,276 B1 | 2/2006 | Okubo et al. |
| 8,637,633 B2 | 1/2014 | Nakamura et al. |
| 10,508,173 B2 | 12/2019 | Imagawa et al. |
| 10,526,452 B2 | 1/2020 | Namiki et al. |
| 10,723,697 B2 | 7/2020 | Shin et al. |
| 2004/0158031 A1 | 8/2004 | Yoshimura et al. |
| 2010/0298519 A1 | 11/2010 | Nakamura et al. |
| 2012/0070780 A1 | 3/2012 | Choi et al. |
| 2012/0142889 A1 | 6/2012 | Aoki et al. |
| 2016/0024119 A1 | 1/2016 | Stossel et al. |
| 2016/0229385 A1 | 8/2016 | Kinlen et al. |
| 2016/0259091 A1 | 9/2016 | Horita et al. |
| 2017/0362445 A1 | 12/2017 | Kinlen et al. |
| 2018/0265637 A1 | 9/2018 | Nishimori et al. |
| 2018/0282269 A1 | 10/2018 | Shin et al. |
| 2020/0216616 A1 | 7/2020 | Nishimori et al. |

FOREIGN PATENT DOCUMENTS

| | | | |
|---|---|---|---|
| CN | 1436779 A | 8/2003 | |
| CN | 1492898 A | 4/2004 | |
| CN | 103109234 A | 5/2013 | |
| CN | 104017216 A | 9/2014 | |
| CN | 105849155 A | 8/2016 | |
| CN | 107250124 A | 10/2017 | |
| CN | 107257868 A | 10/2017 | |
| EP | 0942027 A2 | 9/1999 | |
| EP | 1006374 A2 | 6/2000 | |
| EP | 1270566 A1 | 1/2003 | |
| EP | 1334974 A1 | 8/2003 | |
| EP | 2243798 A1 | 10/2010 | |
| JP | 6061583 A | 4/1985 | |
| JP | 06166701 A | 6/1994 | |
| JP | 2000239384 A | 9/2000 | |
| JP | 2002327061 A | 11/2002 | |
| JP | 2002371081 A | 12/2002 | |
| JP | 2003-233036 A | 8/2003 | |
| JP | 2004516372 A | 6/2004 | |
| JP | 2005162661 A | 6/2005 | |
| JP | 2005-272418 A | 10/2005 | |
| JP | 2008280519 A | 11/2008 | |
| JP | 2009-074024 A | 4/2009 | |
| JP | 2011524865 A | 9/2011 | |
| JP | 2012021080 A | 2/2012 | |
| JP | 2014047199 A | 3/2014 | |
| JP | 2016516864 A | 6/2016 | |
| KR | 10-2010-0099760 A | 9/2010 | |
| KR | 10-2016-0102961 A | 8/2016 | |
| KR | 10-2016-0147710 A | 12/2016 | |
| KR | 10-2017-0075788 A | 7/2017 | |
| KR | 10-1888136 A | 8/2018 | |
| KR | 2020033426 A * | 3/2020 | ......... C08G 18/1875 |
| WO | 02/051911 A1 | 7/2002 | |
| WO | 2016-137533 A1 | 9/2016 | |
| WO | 2016/204080 A1 | 12/2016 | |
| WO | 2018150950 A1 | 8/2018 | |
| WO | WO-2018150950 A1 * | 8/2018 | ............... A62D 3/00 |

OTHER PUBLICATIONS

WO-2018150950-A1 Machine Translation (Year: 2018).*
KR-2020033426-A Machine Translation (Year: 2020).*
Ortolan, et al. (2017).How the electron-deficient cavity of heterocalixarenes recognizes anions: insights from computation, Physical chemistry chemical physics. Vol. 19, pp. 24696-24705.

* cited by examiner

*Primary Examiner* — Terressa Boykin
(74) *Attorney, Agent, or Firm* — Bryan Cave Leighton Paisner LLP

(57) ABSTRACT

A curable composition for forming a high refractive index optical material including an episulfide compound, a cyclic disulfide compound, and a reducing agent, and an optical material comprising a cured product of the curable composition.

18 Claims, No Drawings

CURABLE COMPOSITION AND OPTICAL MATERIAL COMPRISING CURED PRODUCT THEREOF

CROSS-REFERENCE TO RELATED APPLICATION(S)

This application is the U.S. national stage of International Application No. PCT/KR2020/006529, filed on May 19, 2020, which claims the benefit of priority based on Korean Patent Application No. 10-2019-0059609 filed on May 21, 2019, the disclosure of which is incorporated herein by reference in its entirety.

TECHNICAL FIELD

The present disclosure relates to a curable composition for forming a high refractive index optical material, and an optical material comprising a cured product thereof.

BACKGROUND

Recently, a device for providing a 3D image to a user by using a virtual reality device and an augmented reality device has been developed. The virtual reality device or the augmented reality device can make desired images visible to a user by forming a diffraction light guide pattern on a lens such as common glasses.

In general, a lens for a virtual reality device or an augmented reality device uses glass having a high refractive index. Glass may have a high refractive index, light transmittance, flatness, strength, and anti-scratch effect, but can cause fatal damage to the user's eyeball when broken, and may cause discomfort from wearing it for a long period of time due to its high density and heavy weight.

On the other hand, in the case of high refractive plastics, the lens is comfortable to wear since it is lighter than a glass lens, is not easily broken, is relatively safer than a glass lens even if it is broken, and can realize various colors. However, there are problems for the high refractive plastics that it is difficult to implement a high refractive index and a high Abbe number compared to a glass lens, and that haze is high. Thus, research is needed to improve these properties.

SUMMARY

Technical Problem

It is an object of the present disclosure to provide a curable composition for forming a high refractive index optical material, and an optical material comprising a cured product thereof, wherein the optical material not only is lighter than glass or tempered glass for conventional lenses and is capable of implementing various colors while having excellent strength and hardness, but also has excellent optical properties by having low haze value.

Technical Solution

The present disclosure provides a curable composition for forming a high refractive index optical material, the curable composition comprising: an episulfide compound; a cyclic disulfide compound containing one or more repeating units represented by the following Chemical Formula 1; and a reducing agent.

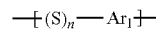

Chemical Formula 1 in the Chemical Formula 1, $Ar_1$ is a heteroarylene having 2 to 30 carbon atoms and containing at least one of nitrogen (N) and sulfur (S) atoms, and n is an integer of 1 to 5.

In addition, the present disclosure provides an optical material comprising a cured product of the composition comprising: an episulfide compound; a cyclic disulfide compound containing one or more repeating units represented by the Chemical Formula 1; and a reducing agent.

Hereinafer, the curable composition and the optical material comprising a cured product thereof according to specific embodiments of the present disclosure will be described in more detail.

The terms used herein are used only to describe exemplary embodiments, and are not intended to limit the invention. A singular expression includes a plural expression unless they have definitely opposite meanings in the context.

It should be understood that the terms "comprise", "include", and "have" as used herein are intended to designate the presence of stated features, region, integer, step, action, element and/or component, but does not exclude a possibility of existence or addition of one or more other features, area, integer, step, action, element, component and/or group.

As used herein, the term "episulfide compound" refers to a compound containing one or more episulfides, wherein the episulfide refers to a compound in which the oxygen (O) atom of the epoxide is substituted with a sulfur (S) atom.

As used herein, the term "thiol compound" refers to a compound containing one or more thiol groups (—SH).

As used herein, the "curable" includes both heat-curable and photo-curable, and the "curable composition" means a heat-curable and/or a photo-curable composition.

As used herein, the high refractivity index means a refractive index of about 1.6 or more at a wavelength ranging from 350 to 800 nm or at a wavelength of 532 nm.

According to an exemplary embodiment of the present invention, there is provided a curable composition for forming a high refractive index optical material comprising: an episulfide compound; a cyclic disulfide compound containing one or more repeating units represented by the Chemical Formula 1; and a reducing agent.

Conventionally, it was confirmed that the refractive index of the optical material, which is a cured product of the curable solution, tends to be higher as the content of sulfur atoms contained in the curable solution is increased, and a curing agent containing a compound having sulfur atom was prepared. However, there was a problem that a large amount of unreacted compounds are generated in the cured product of such curing agent, thereby increasing the haze value of the cured product and deteriorating the optical properties.

However, the present inventors have found that problems of increased haze of the cured product due to the unreacted compound that has not been reacted when curing the curable composition can be prevented by using a reducing agent together with an episulfide compound and a cyclic disulfide having a specific chemical structure, and that the optical material, which is a cured product of such curable composition, is excellent in mechanical properties and optical properties while exhibiting a high refractive index such that an optical material that replaces glass or plastic materials used in the past can be provided, thereby completing the present disclosure.

Accordingly, the curable composition and the optical material containing a cured product thereof can be usefully applied to products or commercial applications, replacing conventional glass or optical glass, such as display bases, display protective films, touch panels, lenes for wearable devices.

The episulfide compound contained in the curable composition may include a compound represented by the following Chemical Formula 4.

Chemical Formula 4 in the Chemical Formula 4, $R_1$ and $R_2$ are each independently hydrogen or an alkyl having 1 to 10 carbon atoms, $R_3$ and $R_4$ are each independently a single bond or an alkylene having 1 to 10 carbon atoms, a is an integer of 0 to 4, and b is an integer of 0 to 6.

The episulfide compound may contain a high content of sulfur (S) atoms having a large atomic refraction in the molecule due to the above-mentioned specific chemical structure, and the refractive index of the cured product can be increased by such high content of sulfur atoms.

Further, the episulfide compound can be cured by ring-opening polymerization, and the alkylene sulfide group formed by ring-opening polymerization of the episulfide group can further increase the high refractive index of the cured product.

Meanwhile, in Chemical Formula 4, $R_1$ and $R_2$ may be each independently hydrogen or a methyl group, but are not limited thereto.

Further, $R_3$ and $R_4$ may be each independently a single bond, methylene, ethylene, propylene, isopropylene, butylene, or isobutylene, but is not limited thereto.

Further, a and b may be each independently 0 or 1.

In Chemical Formula 4, a refers to the number of carbon atoms of the alkylene group contained in the thioether repeating unit. If a is too large, the length of the carbon chain in the molecule becomes longer, and the glass transition temperature of the cured product is lowered during curing, which may cause a problem that the heat resistance of the cured product is lowered, and also may cause a problem that the refractive index of the cured product is lowered as the relative sulfur content becomes lowered.

In Chemical Formula 4, b is the number of repetition of the thio ether repeating unit in which an alkylene group is connected by a sulfur (S) atom. If b is too large, the length of the carbon chain in the molecule becomes longer, and the glass transition temperature of the cured product is lowered after curing, which may cause a problem that the heat resistance of the cured product is deteriorated.

Further, the compound represented by Chemical Formula 4 may be used alone, or in combination of two or more thereof.

The episulfide compound may include, for example, at least one selected from the group consisting of bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane, 1,4-bis(β-epithiopropylthio)butane, etc., but is not necessarily limited thereto.

The content of the episulfide compound may be 50 to 99% by weight, 60 to 95% by weight, or 70 to 90% by weight, based on 100% by weight of the total curable composition. If the content of the episulfide compound is too large, there is a problem that the yellowness index of an optical material such as plastic substrates manufactured after curing increases, and if the content of the episulfide compound is too small, there is a problem that the haze of the optical material manufactured after curing increases and thus the transparency decreases.

The cyclic disulfide compound contained in the curable composition may include one or more repeating units of Chemical Formula 1 described above.

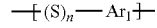

Chemical Formula 1 in the Chemical Formula 1, $Ar_1$ is a heteroarylene having 2 to 30 carbon atoms and containing at least one of nitrogen (N) and sulfur (S) atoms, and n is an integer of 1 to 5.

The cyclic disulfide compound may contain 1 to 20, 2 to 10, or 3 to 5 repeating units of the Chemical Formula 1.

Further, n may be 2 in at least one of the repeating units contained in the cyclic disulfide compound, and when n is 2, it may correspond to a disulfide bond.

The cyclic disulfide compound containing one or more repeating units of Chemical Formula 1 can be cured by ring-opening polymerization, similar to the episulfide compound. Specifically, the ring-opening polymerization may be performed while one or more disulfide bonds are cleaved. More specifically, in the cyclic disulfide compound described above, a thiol group (—SH) may be formed as the disulfide bond is cleaved, which can react with the episulfide compound to form a new disulfide bond or the like, thereby forming a cured product. Consequently, the cured product contains a high content of sulfur (S) atoms having a large atomic refraction, thereby capable of further increasing the refractive index of the cured product.

Though the refractive index is high in the case of a curable composition containing only the episulfide compound and the cyclic disulfide compound, there is a problem that a large amount of unreacted compounds is generated. However, since the curable composition according to an exemplary embodiment includes a reducing agent which is described later, it can prevent the generation of unreacted compounds while maintaining a high refractive index and excellent mechanical properties, and reduce the haze value of the cured product, thereby improving optical properties.

Specifically, the cyclic disulfide compound may include a compound represented by the following Chemical Formula 2 or 3.

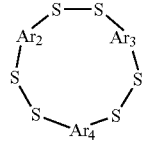

Chemical Formula 2 in the Chemical Formula 2, $Ar_2$ to $Ar_4$ are each independently a heteroarylene having 2 to 30 carbon atoms and containing at least one of nitrogen (N) and sulfur (S) atoms, Chemical Formula 3

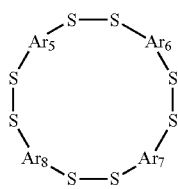

in the Chemical Formula 3, $Ar_5$ to $Ar_8$ are each independently a heteroarylene having 2 to 30 carbon atoms and containing at least one of nitrogen (N) and sulfur (S) atoms.

Specifically, the cyclic disulfide compound represented by Chemical Formula 2 is a compound having a cyclic structure, and has a chemical structure in which three types of heteroarylenes are connected by disulfide bonds, wherein the three types of heteroarylenes may have the same or different chemical structures from each other. On the other hand, the cyclic disulfide compound represented by Chemical Formula 3 is a compound having a cyclic structure, and has a chemical structure in which four types of heteroarylenes are connected by a disulfide bond, wherein the four types of heteroarylenes may have the same or different chemical structures from each other.

Further, the compounds represented by Chemical Formula 2 or 3 may be used alone or in combination of two or more thereof.

The cyclic disulfide compound may include at least one selected from the group consisting of the following, but is not necessarily limited thereto.

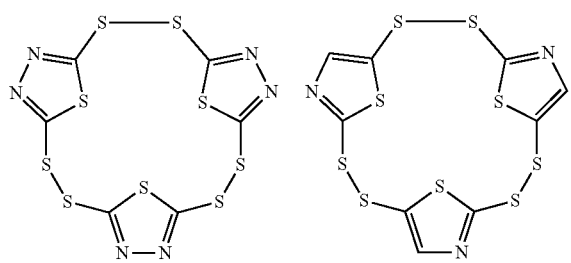

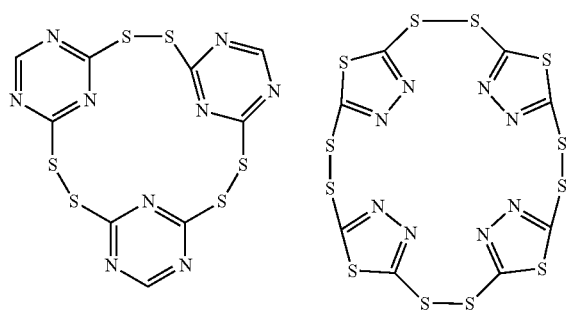

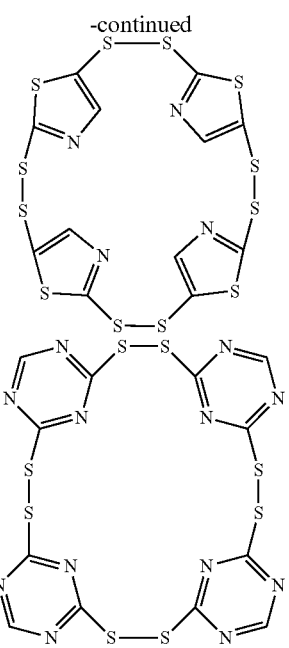

The content of the cyclic disulfide compound may be 1 to 30% by weight, 5 to 20% by weight, or 8 to 15% by weight, based on 100% by weight of the total curable composition. If the content of the cyclic disulfide compound is too large, there is a problem that the haze of the optical material such as a plastic substrate formed after curing increases, and the yellowness index also increases, and if the content of the cyclic disulfide compound is too small, there is a problem that the refractive index of the optical material formed after curing decreases.

The curable composition may include a reducing agent. The reducing agent may serve to reduce the cyclic disulfide compound so that the reduced disulfide compound reacts with the episulfide compound.

Specifically, when the disulfide bond contained in the cyclic disulfide compound is not cleaved or the broken disulfide bond reacts with a material other than episulfide at curing the curable composition, the cyclic disulfide compounds and by-products may remain as unreacted compounds in the cured product. In such a case, there is a problem that the haze value of the cured product is increased and thus the optical properties are deteriorated, or a process of removing unreacted compounds using a filter is additionally required.

However, the reducing agent cleaves the disulfide bond in the cyclic disulfide compound, and makes it possible to bind with the episulfide compound to finally produce a cured product, thereby preventing the generation of unreacted compounds, lowering the haze value of the final cured product, and improving the optical properties.

Further, the reducing agent cleaves the disulfide bond of the cyclic disulfide compound having low solubility and thereby, can increase the solubility with the curable composition and shorten the time required for mixing the composition, and further can contribute to the effect of minimizing the filtering process and improving processability.

The reducing agent may include, for example, at least one selected from the group consisting of 1,4-dimercaptobutane-2,3-diol (DTT), tris(2-carboxylethyl)phosphine (TCEP), tris (3-hydroxypropyl)phosphine (THPP), β-mercaptoethanol (BME) and dithiobutylamine (DTBA), but is not necessarily limited thereto.

The content of the reducing agent may be 0.001 to 20% by weight, 0.01 to 15% by weight, or 0.05 to 10% by weight, based on 100% by weight of the total curable composition. If the content of the reducing agent is too high, there is a problem that the glass transition temperature (Tg) of the optical material formed after curing is lowered, and if the content of the reducing agent is too low, there is a problem that the haze of the optical material increases.

The curable composition may further include a thiol compound represented by the following Chemical Formula 5.

Chemical Formula 5 in the Chemical Formula 5, $R_5$ and $R_6$ are each independently a single bond or an alkylene having 1 to 10 carbon atoms, c is an integer of 0 to 4, and d is an integer of 0 to 6.

Specifically, the thiol compound represented by Chemical Formula 5 has an aliphatic chain type skeleton in which thiol groups (—SH) are connected at both ends of the molecule, and in the aliphatic chain, the alkylene group may have a repeating unit in the form of a thio ether connected by a sulfur (S) atom.

In the curing reaction with the episulfide compound, that is, in the ring-opening polymerization reaction of the episulfide group, the thiol compound reacts with the episulfide group to form a disulfide bond, thereby producing a cured product, and the refractive index of the cured product can be further increased by including a high content of sulfur (S) atoms having high atomic refraction in the molecule.

On the other hand, in the Chemical Formula 5, $R_5$ and $R_6$ may be each independently a single bond, methylene, ethylene, propylene, isopropylene, butylene, or isobutylene, but are not limited thereto.

Further, c and d may be each independently 0 or 1.

In Chemical Formula 5, c refers to the number of carbon atoms of the alkylene group contained in the thioether repeating unit. If c is too large, the length of the carbon chain in the molecule becomes longer, and the glass transition temperature of the cured product is lowered during curing, which may cause a problem that the heat resistance of the cured product is lowered, and further the relative sulfur content becomes lower, which may cause a problem that the refractive index of the cured product is lowered.

In Chemical Formula 5, d is the number of repetition of the thio ether repeating unit in which an alkylene group is connected by a sulfur (S) atom. If d is too large, the length of the carbon chain in the molecule becomes longer, and the glass transition temperature of the cured product is lowered during curing, which may cause a problem that the heat resistance of the cured product is lowered.

Further, the compound represented by Chemical Formula 5 may be used alone, or in combination of two or more thereof.

The thiol compound may include, for example, at least one selected from the group consisting of the following.

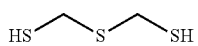 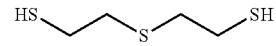

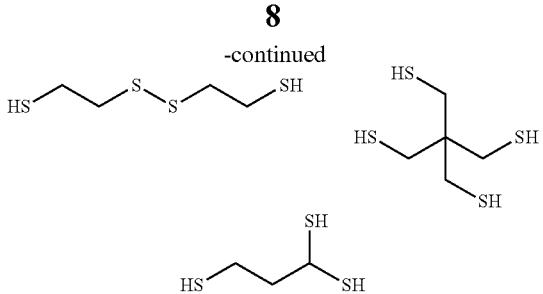

The content of the thiol compound may be 0.1 to 15% by weight, 0.5 to 10% by weight, or 1 to 5% by weight, based on 100% by weight of the total curable composition. If the content of the thiol compound is too high, there is a problem that the glass transition temperature (Tg) of the optical material formed after curing is lowered, and if the content of the thiol compound is too low, there is a problem that the haze of the optical material increases.

In the curable composition according to the one embodiment, the weight ratio between the episulfide compound and the cyclic disulfide compound may be 7:3 to 9:1, 8:2 to 9:1, or 8.5:1.5 to 9:1. If the weight ratio between the episulfide compound and the cyclic disulfide compound is less than 7:3, there is a problem that the yellowness index of the optical material such as plastic substrates formed after curing increases, and if the weight ratio exceeds 9:1, there is a problem that the refractive index of the optical material after curing is lowered.

Further, in the curable composition, the weight ratio between the reducing agent and the cyclic disulfide compound may be 1:10 to 500, 1:20 to 400, or 1:30 to 300. If the weight ratio between the reducing agent and the cyclic disulfide compound is less than 1:10, there is a problem that the glass transition temperature (Tg) of the optical material formed after curing is lowered, and if the weight ratio exceeds 1:500, there is a problem that the the haze of the optical material increases.

The curable composition according to the one embodiment may further include a catalyst. The catalyst is not particularly limited as long as it serves to accelerate the curing reaction of the curable composition. Examples thereof include imidazole derivatives such as imidazole, 2-methylimidazole, 2-methylimidazole, 2-ethylimidazole, 2-ethyl-4-methylimidazole, 2-phenylimidazole, 4-phenylimidazole, 1-cyanoethyl-2-phenylimidazole, 1-(2-cyanoethyl)-2-ethyl-4-methylimidazole or the like; amine compounds such as dicyandiamide, benzyldimethylamine, 4-(dimethylamino)-N,N-dimethyl benzylamine, 4-methoxy-N,N-dimethylbenzylamine, 4-methyl-N,N-dimethylbenzylamine, N,N-dicyclohexylmethylamine or the like; hydrazine compounds such as adipic acid dihydrazide and sebacic acid dihydrazide; and phosphorus compounds such as triphenylphosphine. Further, examples of commercially available products include 2MZ-A, 2MZ-OK, 2PHZ, 2P4BHZ, 2P4MHZ manufactured by Shikoku Kasei Kogyo (all are product names of imidazole-based compounds), U-CAT3503N, UCAT3502T manufactured by San Apro (all are product names of blocked isocyanate compounds of dimethylamine), DBU, DBN, U-CATSA102, U-CAT5002 (all are bicyclic amidine compounds and salts thereof), etc.

The content of the catalyst may be 0.001 to 10% by weight, 0.01 to 5% by weight, or 0.1 to 1% by weight, based on 100% by weight of the total curable composition. If the content of the catalyst is too large, there is a problem that the curing rate increases and the storage stability of the composition decreases, and if the content of the catalyst is too small, there is a problem that the curing speed becomes slower and the thermal curing process becomes longer.

Further, the curable composition may, in addition to the above, further include other additives used for imparting a specific function to a display substrate in the technical field to which the present disclosure pertains, such as an ultraviolet absorber, a bluing agent, and a pigment.

According to another embodiment of the invention, there is provided an optical material comprising a cured product of the composition containing an episulfide compound; a cyclic disulfide compound containing at least one repeating unit of Chemical Formula 1; and a reducing agent.

In addition, the composition may further include a thiol compound represented by the Chemical Formula 5.

In addition, the episulfide compound, the cyclic disulfide compound, the reducing agent, the additive and the like contained in the optical material are replaced by those described in the above-mentioned photocurable composition.

Such an optical material can be produced by the method of curing the above-mentioned curable composition. Specifically, the above-mentioned curable composition or a uniform composition containing various additives in the curable composition is prepared, and the composition is injected into a mold frame made by combining a mold made of a component such as glass, metal, or polymer resin with a resinous gasket, and then heated and cured. At this time, in order to facilitate the extraction of the finally prepared resin after molding, the mold may be subjected to a release treatment in advance, or a release agent may be further added to the above-described composition for use.

The temperature of the curing reaction may vary depending on the type and content of the compound used. In general, the curing may proceed at about 50 to about 120° C., or about 60 to about 100° C., and the curing time may be about 0.1 to about 72 hours, or about 0.5 to about 24 hours.

The curing reaction may be performed by combining a step of maintaining the above-mentioned predetermined polymerization temperature for a certain period of time, a temperature raising step, a temperature lowering step, and the like. After completion of the reaction, post-treatment can be performed at a temperature condition of about 50 to about 150° C., or about 80 to about 120° C. for about 10 minutes to about 3 hours, thereby preventing deformation.

The optical material released after polymerization may have various functionalities through processes such as dyeing, coating, and the like.

The optical material according to the other embodiment may have a refractive index of 1.65 or more, 1.650 to 1.800, 1.700 to 1.800, or 1.700 to 1.750.

Further, the optical material may have a very high transmittance, specifically, a transmittance value measured in accordance with JIS K 7361 when the thickness is 1 mm, of 80% or more, 80 to 99%, or 85 to 90%, and.

Further, the optical material may have a very low haze, specifically, a haze value measured according to JIS K 7136 when the thickness is 1 mm, of 1.2% or less, 0.01 to 1.0%, or 0.01 to 0.7%.

The optical material according to the other embodiment may be included in the wearable device, and specifically, it can be used in place of glass or tempered glass for a lens of a wearable device.

That is, the optical material has high refractive properties comparable to glass, and also is lighter than glass or tempered glass, and in addition to mechanical properties such as strength and hardness, has excellent optical properties as described above, and thereby, can be used as a lens of a wearable device such as an augmented reality device or a virtual reality device.

Advantageous Effects

According to the present disclosure, it is possible to provide a curable composition for forming a high refractive index optical material that not only is lighter than glass or tempered glass used for conventional lenses, and can realize various colors while having excellent strength and hardness, but also has low haze value and is has excellent optical properties while being capable of realizing a high-refractive index, and an optical material comprising a cured product thereof.

DETAILED DESCRIPTION

Hereinafter, the actions and effects of the invention will be described in more detail through specific examples of the invention. However, these examples are for illustrative purposes only, and the scope of rights of the invention is not determined thereby.

Example 1

87 g of the following 70A as an episulfide compound, 13 g of the following cyclic disulfide compound, and 0.1 g of 1,4-dimercaptobutane-2,3-diol (DTT) as a reducing agent were vigorously mixed at 10° C. for 2 hours, and then the mixture was filtered using a glass filter having a pore size of 1 μm. Then, 0.5 g of N,N-dicyclohexylmethylamine was added as a catalyst and mixed for 5 minutes to prepare a curable composition.

A 1 mm thick slide glass was placed on both sides of a LCD glass having a size of 10 cm in width and length, and about 5 g of the above-mentioned mixed solution was applied to the center of the LCD glass, and then covered with another LCD glass to prepare a mold. This was put in an oven, and the curing reaction was performed at about 60° C. for about 10 hours and at about 90° C. for about 4 hours. After taken out of the oven, the LCD glass was removed to obtain a flat plastic specimen (optical material). The thickness of the plastic specimen was about 1 mm, and this thickness was measured using a Mitutoyo thickness gauge (Model: ID-C112XBS).

Examples 2 to 8 and Comparative Examples 1 to 2

A curable composition and a plastic specimen (optical material) as a cured product thereof were prepared in the same manner as in Example 1, except that the episulfide compound, the cyclic disulfide compound, and the reducing agent were used in the amount of the compounds shown in Table 1 below, and the mixing temperature was controlled to the temperature listed in Table 1 below.

On the other hand, in Examples 5 to 8 and Comparative Example 2, the following 70B as a thiol compound was further used at the content shown in Table 1 below.

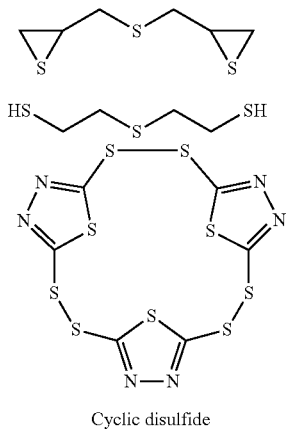

Cyclic disulfide

Evaluation of Physical Properties

1. Evaluation of Transmittance, Haze and Yellowness Index

The transmittance (JIS K 7361) and haze (JIS K 7136) of the specimen were measured in the thickness direction of the cured product cured to a 1 mm standard thickness using NDH-5000 manufactured by Nippon Denshoku Industries Co., LTD., and the results are shown in Table 2 below.

In addition, the yellowness index of the specimen was measured using a colorimeter, and the results are shown in Table 2 below.

2. Measurement of Sulfur Atom Content

The content of sulfur atoms in the specimen was measured using an elemental analysis method, and the results are shown in Table 2 below.

3. Measurement of Refractive Index

For the specimen, the refractive index value at a wavelength of 532 nm was measured using spectroscopic ellipsometry manufactured by Ellipso Technology, and the results are shown in Table 2 below.

4. Measurement of Glass Transition Temperature (Tg)

The glass transition temperature of the specimen was measured using a differential scanning calorimeter (DSC) manufactured by TA Instrument, and the results are shown in Table 2 below.

TABLE 2

|  | Haze (%) | Transmittance (%) | Yellowness index | Sulfur atom content (wt. %) | Refractive index | Glass transition temperature (° C.) |
|---|---|---|---|---|---|---|
| Example 1 | 1.19 | 87.1 | 4.92 | 54.85 | 1.74 | 85.0 |
| Example 2 | 0.97 | 87.3 | 4.78 | 54.82 | 1.74 | 84.3 |
| Example 3 | 0.62 | 87.3 | 4.41 | 54.82 | 1.74 | 84.4 |
| Example 4 | 0.71 | 87.3 | 4.54 | 54.78 | 1.74 | 83.3 |
| Example 5 | 1.12 | 87.0 | 4.43 | 54.82 | 1.74 | 73.4 |
| Example 6 | 1.09 | 87.1 | 4.11 | 54.75 | 1.74 | 73.2 |
| Example 7 | 0.62 | 87.1 | 3.90 | 54.75 | 1.74 | 73.2 |
| Example 8 | 1.00 | 87.1 | 4.10 | 54.59 | 1.74 | 73.1 |
| Comparative Example 1 | 1.56 | 86.6 | 5.23 | 54.87 | 1.74 | 85.4 |
| Comparative Example 2 | 1.27 | 86.3 | 4.32 | 54.82 | 1.74 | 73.7 |

TABLE 1

| (unit: g) | 70A | 70B | Cyclic disulfide | Catalyst | DTT | Mixing temperature (° C.) |
|---|---|---|---|---|---|---|
| Example 1 | 87 | — | 13 | 0.5 | 0.1 | 10 |
| Example 2 | 87 | — | 13 | 0.5 | 0.3 | 10 |
| Example 3 | 87 | — | 13 | 0.5 | 0.3 | 25 |
| Example 4 | 87 | — | 13 | 0.5 | 0.5 | 10 |
| Example 5 | 87 | 3 | 10 | 0.5 | 0.3 | 10 |
| Example 6 | 87 | 3 | 10 | 0.5 | 0.5 | 10 |
| Example 7 | 87 | 3 | 10 | 0.5 | 0.5 | 25 |
| Example 8 | 87 | 3 | 10 | 0.5 | 0.7 | 10 |
| Comparative Example 1 | 87 | — | 13 | 0.5 | — | 10 |
| Comparative Example 2 | 87 | 3 | 10 | 0.5 | — | 10 |

Referring to Table 2, it was confirmed that the specimen including the cured product according to Examples of the present disclosure had a very low haze of 1.2% or less. In particular, in Examples 3 and 7, the mixing temperature of the composition was controlled to 25° C., and in particular, the temperature of the reduction reaction of cyclic disulfide through a reducing agent was controlled to 25° C., and the haze was as very low as 0.62%.

On the other hand, in the case of Comparative Examples 1 and 2, it was confirmed that the haze was too high and the optical properties were low compared to Examples of the present disclosure.

In addition, in Examples 1 to 8, it was confirmed that the transmittance was as high as 87.0% or more, and the yellowness index as low as 4.92 or less, and thus, the optical properties were excellent, and that the refractive index was 1.74, which had a high refractive index similar to glass, and thus could be used as an optical material instead of glass. Further, it was confirmed that the glass transition temperature was 73.1° C. or more, and the heat resistance of the optical material as a cured product was excellent.

However, in the case of Comparative Examples 1 and 2, it was confirmed that the refractive index and the glass transition temperature were similar to those of Examples, but the optical properties of the transmittance were not good. In addition, it was confirmed that Comparative Example 1 exhibited substantially high values for both haze and yellowness index, since Comparative Example 1 did not contain a reducing agent even though it contained a large amount of cyclic disulfide compound.

What is claimed is:

1. A curable composition for forming a high refractive index optical material comprising: an episulfide compound; a cyclic disulfide compound containing one or more repeating units represented by the following Chemical Formula 1; and a reducing agent, Chemical Formula 1

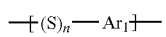

wherein in the Chemical Formula 1,
Ar1 is a heteroarylene having 2 to 30 carbon atoms and containing at least one of nitrogen (N) and sulfur (S) atoms, and
n is an integer of 1 to 5.

2. The curable composition according to claim 1, wherein the cyclic disulfide compound comprises a compound represented by the following Chemical Formula 2 or 3, Chemical Formula 2

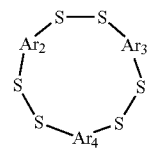

wherein in the Chemical Formula 2,
Ar2 to Ar4 are each independently a heteroarylene having 2 to 30 carbon atoms and containing at least one of nitrogen (N) and sulfur (S) atoms, Chemical Formula 3

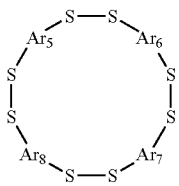

wherein in the Chemical Formula 3,
Ar5 to Ar8 are each independently a heteroarylene having 2 to 30 carbon atoms and containing at least one of nitrogen (N) and sulfur (S) atoms.

3. The curable composition according to claim 1, wherein the episulfide compound comprises a compound represented by the following Chemical Formula 4

Chemical Formula 4

wherein in the Chemical Formula 4,
$R_1$ and $R_2$ are each independently hydrogen or an alkyl having 1 to 10 carbon atoms,
$R_3$ and $R_4$ are each independently a single bond or an alkylene having 1 to 10 carbon atoms,
a is an integer of 0 to 4, and
b is an integer of 0 to 6.

4. The curable composition according to claim 1, wherein the cyclic disulfide compound comprises at least one selected from the group consisting of the following:

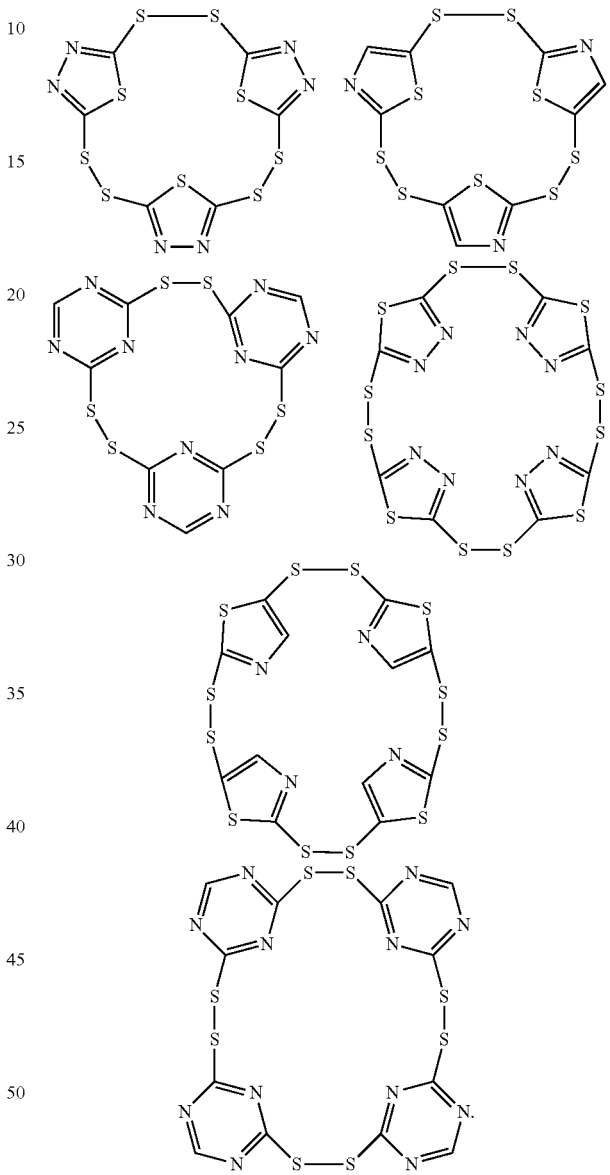

5. The curable composition according to claim 1, wherein the episulfide compound comprises at least one selected from the group consisting of bis((β-epithiopropyl)sulfide, bis((β-epithiopropyl)disulfide, bis(β-epithiopropylthio)methane, 1,2-bis(β-epithiopropylthio)ethane, 1,3-bis((β-epithiopropylthio)propane, and 1,4-bis((β-epithiopropylthio)butane.

6. The curable composition according to claim 1, wherein the reducing agent comprises at least one selected from the group consisting of 1,4-dimercaptobutane-2,3-diol (DTT), tris(2-carboxyethyl)phosphine (TCEP), tris(3-hydroxypropyl)phosphine (THPP), β-mercaptoethanol (BME) and dithiobutylamine (DTBA).

7. The curable composition according to claim 1, wherein the curable composition further comprises a thiol compound represented by the following Chemical Formula 5, Chemical Formula 5

wherein in the Chemical Formula 5,
$R_5$ and $R_6$ are each independently a single bond or an alkylene having 1 to 10 carbon atoms,
c is an integer of 0 to 4, and
d is an integer of 0 to 6.

8. The curable composition according to claim 7, wherein the thiol compound comprises at least one selected from the group consisting of the following:

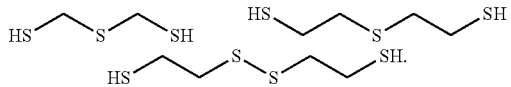

9. The curable composition according to claim 1, wherein a weight ratio between the episulfide compound and the cyclic disulfide compound is 7:3 to 9:1.

10. The curable composition according to claim 1, wherein a weight ratio between the reducing agent and the cyclic disulfide compound is 1:10 to 1:500.

11. The curable composition according to claim 1, wherein the curable composition further comprises a catalyst.

12. An optical material including a cured product of a composition, the composition comprises:
an episulfide compound;
a cyclic disulfide compound containing at least one repeating unit of the following Chemical Formula 1; and a reducing agent, Chemical Formula 1

wherein in the Chemical Formula 1, $Ar_1$ is a heteroarylene having 2 to 30 carbon atoms and containing at least one of nitrogen (N) and sulfur (S) atoms, and
n is an integer of 1 to 5.

13. The optical material according to claim 12, wherein the composition further comprises a thiol compound represented by the following Chemical Formula 5, Chemical Formula 5

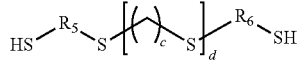

wherein in the Chemical Formula 5,
$R_5$ and $R_6$ are each independently a single bond or an alkylene having 1 to 10 carbon atoms,
c is an integer of 0 to 4, and
d is an integer of 0 to 6.

14. The optical material according to claim 12, wherein the optical material has a refractive index of 1.65 or more.

15. The optical material according to claim 12, wherein the optical material has a transmittance of 80% or more.

16. The optical material according to claim 12, wherein the optical material has a haze of 1.2% or less.

17. The optical material according to claim 12, wherein the optical material is for a lens of a wearable device.

18. The curable composition according to claim 1, wherein the curable composition further comprises a thiol compound comprising at least one selected from the group consisting of the following:

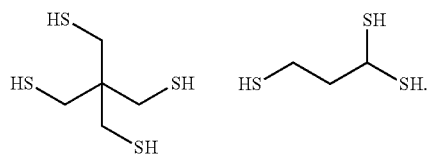 [SMILES: SCC(CS)(CS)CS ; SCCC(S)S]

* * * * *